US010164853B2

(12) United States Patent
VanAntwerp et al.

(10) Patent No.: US 10,164,853 B2
(45) Date of Patent: Dec. 25, 2018

(54) REAL-TIME ANOMALY MITIGATION IN A CLOUD-BASED VIDEO STREAMING SYSTEM

(71) Applicant: iStreamPlanet Co., LLC, Las Vegas, NV (US)

(72) Inventors: Mark Daniel VanAntwerp, Seattle, WA (US); Weimin Mark Wang, Bellevue, WA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 140 days.

(21) Appl. No.: 14/725,919

(22) Filed: May 29, 2015

(65) Prior Publication Data

US 2016/0352603 A1    Dec. 1, 2016

(51) Int. Cl.
*G06F 15/16*         (2006.01)
*H04L 12/26*         (2006.01)
(Continued)

(52) U.S. Cl.
CPC ........ *H04L 43/0847* (2013.01); *H04L 65/605* (2013.01); *H04L 65/607* (2013.01); *H04L 41/5038* (2013.01)

(58) Field of Classification Search
CPC .. H04N 21/24; H04N 21/2187; H04N 21/274; H04N 21/47202; G06F 17/30867; G06F 21/53; G06F 17/30241; G06F 17/3053; G06F 17/30554; G06F 17/30598; G06F 17/30604; G06F 2009/4557; G06F 2009/45587; G06F 2009/45591; G06F 2009/45595; G06F 21/60; G06F 9/45533; G06F 9/45558; G06F 11/0751; G06F 2201/865; H04L 69/22; H04L 67/10; H04L 69/325; H04L 63/1425; H04L 67/22; H04L 41/12; H04L 43/16; H04L 63/20; H04L 67/16; H04L 41/0668; H04L 43/08; H04L 43/10; H04L 63/1408; H04L 67/12; H04L 41/0816; H04L 43/04; H04L 43/0811;
(Continued)

(56) References Cited

U.S. PATENT DOCUMENTS 5,742,821 A    4/1998  Prasanna
5,913,038 A    6/1999  Griffiths
(Continued)

OTHER PUBLICATIONS

Non-Final Office Action, U.S. Appl. No. 14/448,915, dated Sep. 1, 2015, 20 pages.
(Continued)

*Primary Examiner* — Djenane M Bayard
(74) *Attorney, Agent, or Firm* — NDWE, LLP

(57) ABSTRACT

A method for detect and mitigate anomaly in video streaming platforms is disclosed. In one embodiment, performance data from a set of workers is received at a central telemetry system (CTS), where the performance data is indicative of operational status of the set of workers. The CTS processes the performance data, including generating task-specific monitoring data based on the performance data, and it identifies whether the performance data or the task-specific monitoring data contains any anomaly. Upon an anomaly being identified, the CTS mitigates the anomaly by interacting with the set of workers.

18 Claims, 11 Drawing Sheets

(51) Int. Cl.
*H04L 29/06* (2006.01)
*H04L 12/24* (2006.01)

(58) Field of Classification Search
CPC . H04L 45/74; H04L 63/1416; H04L 63/1433; H04L 1/242; H04L 41/046
See application file for complete search history.

(56) References Cited

U.S. PATENT DOCUMENTS

| | | | |
|---|---|---|---|
| 6,110,220 | A | 8/2000 | Dave et al. |
| 6,195,680 | B1 | 2/2001 | Goldszmidt et al. |
| 6,407,680 | B1 | 6/2002 | Lai et al. |
| 6,571,282 | B1 | 5/2003 | Bowman-Amuah |
| 6,769,127 | B1 | 7/2004 | Bonomi et al. |
| 7,080,153 | B2 | 7/2006 | Monteiro et al. |
| 7,325,232 | B2 | 1/2008 | Liem |
| 7,761,591 | B2 | 7/2010 | Graham |
| 7,925,781 | B1 | 4/2011 | Chan et al. |
| 8,010,830 | B2 | 8/2011 | Hotta et al. |
| 8,015,564 | B1 | 9/2011 | Beyer et al. |
| 8,059,662 | B2 | 11/2011 | Moote et al. |
| 8,135,413 | B2 | 3/2012 | Dupray |
| 8,185,908 | B2 | 5/2012 | Taniguchi et al. |
| 8,386,630 | B1 | 2/2013 | Atzmon |
| 8,417,762 | B2 | 4/2013 | Branson et al. |
| 8,589,992 | B2 | 11/2013 | Babic |
| 8,607,091 | B2 | 12/2013 | Asbun et al. |
| 8,745,628 | B2 | 6/2014 | Buco et al. |
| 8,752,112 | B2 | 6/2014 | Krasic et al. |
| 8,752,113 | B1 | 6/2014 | Krasic et al. |
| 8,768,048 | B1 | 7/2014 | Kwatra |
| 8,959,370 | B2 | 2/2015 | Zomaya et al. |
| 8,964,858 | B2* | 2/2015 | Boyes ................ H04N 17/004 375/240.27 |
| 8,984,520 | B2 | 3/2015 | Liu et al. |
| 8,997,109 | B2 | 3/2015 | Lee et al. |
| 9,038,086 | B2 | 5/2015 | Dees |
| 9,054,911 | B1 | 6/2015 | Glover et al. |
| 9,344,751 | B1 | 5/2016 | Ream et al. |
| 9,407,944 | B1 | 8/2016 | Galdy et al. |
| 2001/0027491 | A1 | 10/2001 | Terretta et al. |
| 2002/0141584 | A1 | 10/2002 | Razdan et al. |
| 2003/0142670 | A1 | 7/2003 | Gould et al. |
| 2003/0163829 | A1 | 8/2003 | Coufal et al. |
| 2003/0208638 | A1 | 11/2003 | Abrams et al. |
| 2004/0047354 | A1 | 3/2004 | Slater et al. |
| 2004/0117427 | A1 | 6/2004 | Allen et al. |
| 2004/0128386 | A1 | 7/2004 | Oomoto et al. |
| 2006/0195602 | A1 | 8/2006 | Shibata et al. |
| 2007/0033247 | A1 | 2/2007 | Martin |
| 2007/0038567 | A1 | 2/2007 | Allaire et al. |
| 2007/0078768 | A1 | 4/2007 | Dawson |
| 2007/0101379 | A1 | 5/2007 | Perriera |
| 2007/0127667 | A1 | 6/2007 | Rachamadugu |
| 2007/0153679 | A1 | 7/2007 | Jost et al. |
| 2007/0211280 | A1 | 9/2007 | Bansal et al. |
| 2007/0237185 | A1 | 10/2007 | Perriera et al. |
| 2008/0112312 | A1 | 5/2008 | Hermsmeyer et al. |
| 2008/0112336 | A1 | 5/2008 | Gray et al. |
| 2008/0187285 | A1 | 8/2008 | Thekkethil |
| 2008/0195743 | A1 | 8/2008 | Brueck et al. |
| 2008/0225698 | A1 | 9/2008 | Smith et al. |
| 2008/0307258 | A1 | 12/2008 | Challenger et al. |
| 2009/0070827 | A1 | 3/2009 | Barroso |
| 2009/0083279 | A1 | 3/2009 | Hasek |
| 2009/0254952 | A1 | 10/2009 | Sridhar et al. |
| 2009/0304004 | A1 | 12/2009 | Huynh Van et al. |
| 2010/0070753 | A1* | 3/2010 | Kido .................... G06Q 10/06 713/150 |
| 2010/0122040 | A1 | 5/2010 | Asai et al. |
| 2010/0223620 | A1 | 9/2010 | Nair et al. |
| 2011/0022689 | A1 | 1/2011 | Piepenbrink et al. |
| 2011/0154358 | A1 | 6/2011 | Di Balsamo et al. |
| 2011/0167304 | A1 | 7/2011 | Asbun et al. |
| 2011/0246621 | A1 | 10/2011 | May, Jr. |
| 2011/0296473 | A1 | 12/2011 | Babic |
| 2012/0023529 | A1 | 1/2012 | Azam et al. |
| 2012/0089829 | A1 | 4/2012 | Kholidy |
| 2013/0064286 | A1 | 3/2013 | Karlsson et al. |
| 2013/0064305 | A1 | 3/2013 | Karlsson et al. |
| 2013/0103785 | A1 | 4/2013 | Lyon |
| 2013/0257883 | A1 | 10/2013 | Krig et al. |
| 2013/0276048 | A1 | 10/2013 | Krasic et al. |
| 2015/0103837 | A1 | 4/2015 | Dutta et al. |
| 2015/0105148 | A1 | 4/2015 | Consul et al. |
| 2015/0281032 | A1* | 10/2015 | Bragstad ............. H04L 41/0806 709/219 |
| 2016/0034306 | A1 | 2/2016 | Galdy et al. |
| 2016/0036693 | A1 | 2/2016 | Galdy et al. |
| 2016/0036886 | A1 | 2/2016 | Ito |
| 2016/0080460 | A1* | 3/2016 | Chung .................. H04M 3/304 709/224 |
| 2016/0110406 | A1* | 4/2016 | Zircher ............. G06F 17/30371 707/690 |
| 2016/0192029 | A1* | 6/2016 | Bergstrom .......... H04L 43/0882 725/109 |
| 2016/0330497 | A1 | 11/2016 | VanAntwerp |
| 2017/0149518 | A1 | 5/2017 | Hartlmueller et al. |
| 2017/0220451 | A1 | 8/2017 | Mankovskii |

OTHER PUBLICATIONS

Liang et al., "Cross-Tree Adjustment for Saptialized Audio Streaming over Networked Virtual Environments", ACM, pp. 73-78, 2003.
Iqbal et al., "An Analytical Approach to Model Adaptive Video Streaming and Delivery", ACM, pp. 55-58, 2010.
Final Office Action, U.S. Appl. No. 14/448,915, dated Jan. 21, 2016, 11 pages.
Supplemental Notice of Allowance, U.S. Appl. No. 14/708,135, dated Apr. 19, 2016, 4 pages.
Notice of Allowance for U.S. Appl. No. 14/708,128, dated May 11, 2016, 30 pages.
Non-Final Office Action, U.S. Appl. No. 14/708,139, dated Jul. 19, 2016, 21 pages.
Final Office Action, U.S. Appl. No. 14/448,996, dated Oct. 20, 2016, 16 pages.
Advisory Action, U.S. Appl. No. 14/448,996, dated Dec. 14, 2016, 5 pages.
"AT&T Enhances Its Digital Media Solutions Portfolio With New Features That Expand Content Management and Delivery Capabilities", iStreamPlanet, Articles, http://www.istreamplanet.com/NewsItem.aspx?nid=113, (Apr. 13, 2010), 2 pages.
"iStreamPlanet Announces Flash Media Server 3.5 and HTTP Dynamic Streaming Support for the Adobe Flash Platform", iStreamPlanet, Articles, http://www.istreamplanet.com/NewsItem.aspx?nid=115, (May 11, 2010), 2 pages.
"iStreamPlanet announces official integration of Microsoft Silverlight Rough Cut Editor (RCE) into its Video Workflow Automation Platform (VWAP)", iStreamPlanet, Articles, http://www.istreamplanet.com/NewsItem.aspx?nid=110, (Mar. 12, 2010), 2 pages.
"iStreamPlanet announces Release of Its Video Workflow Automation Platform", iStreamPlanet, Articles, http://www.istreamplanet.com/NewsItem.aspx?nid=107, (Mar. 15, 2010), 2 pages.
"iStreamPlanet Announces Support for Microsoft Silverlight 4", iStreamPlanet, Articles, http://www.istreamplanet.com/NewsItem.aspx?nid=111, (Apr. 13, 2010), 2 pages.
"iStreamPlanet selected by NBC Sports to Provide Live Web Broadcast Experience of the 2010 US Open Golf Tournament at Pebble Beach and Championships 2010 at Wimbledon", iStreamPlanet, Articles, http://www.istreamplanet.com/NewsItem.aspx?nid=120, (Jun. 29, 2010), 2 pages.
"Record Interactive and Online Viewing for CTVOlympics.ca & RDSolympiques.ca: The Vancouver 2010 Olympic Winter Games in Review", iStreamPlanet, Articles, http://www.istreamplanet.com/NewsItem.aspx?nid=109, (Mar. 18, 2010), 2 pages.
"Spinnaker HD/7100", Inlet Technologies, www.InletHD.com., (May 2010), 2 pages.

(56) References Cited

OTHER PUBLICATIONS

"Spinnaker HD-X/8100", Inlet Technologies, www.InletHD.com., (May 2010), 2 pages.
"Spinnaker IP/6000", Inlet Technologies, www.InletHD.com., (May 2010), 2 pages.
Office Action, U.S. Appl. No. 12/789,106, dated Apr. 11, 2012, 26 pages.
Final Office Action, U.S. Appl. No. 12/789,106, dated Aug. 27, 2012, 30 pages.
Notice of Allowance, U.S. Appl. No. 12/789,106, dated Jul. 5, 2013, 22 pages.
Non-Final Office Action, U.S. Appl. No. 14/448,996, dated Mar. 15, 2016, 22 pages.
Notice of Allowance, U.S. Appl. No. 14/448,915, dated Apr. 13, 2016, 10 pages.
Notice of Allowance, U.S. Appl. No. 14/708,135, dated Mar. 21, 2016, 30 pages.
Chen, et al., "A Directed Acyclic Graph based Detection for RBAC Based Secure Interoperation", IEEE, pp. 759-764, 2009.
Rao, et al, "Association Rule Mining Using FPTree as Directed Acyclic Graph", IEEE ICAESM, pp. 202-207, Mar. 30-31, 2012.
Roig, et al, "A New Task Graph Model for Mapping Message Passing Applications", IEEE Transactions on Parallel and Distributed Systems, vol. 18, No. 12, pp. 1740-1753, Dec. 2007.
Tao, et al., "Directed Acyclic Graph Version Model Applied in Product Structure Configuration", IEEE, pp. 1-4, 2008.
Non-Final Office Action from U.S. Appl. No. 14/448,981, dated Mar. 23, 2017, 51 pages.
Non-Final Office Action from U.S. Appl. No. 14/448,996, dated Mar. 23, 2017, 19 pages.
Notice of Allowance from U.S. Appl. No. 14/708,139, dated Feb. 15, 2017, 20 pages.
Notice of Allowance from U.S. Appl. No. 14/448,996, dated Sep. 12, 2017, 14 pages.
Notice of Allowance from U.S. Appl. No. 14/708,139, dated May 9, 2017, 13 pages.
Notice of Allowance from U.S. Appl. No. 14/448,981, dated Oct. 10, 2017, 13 pages.

\* cited by examiner

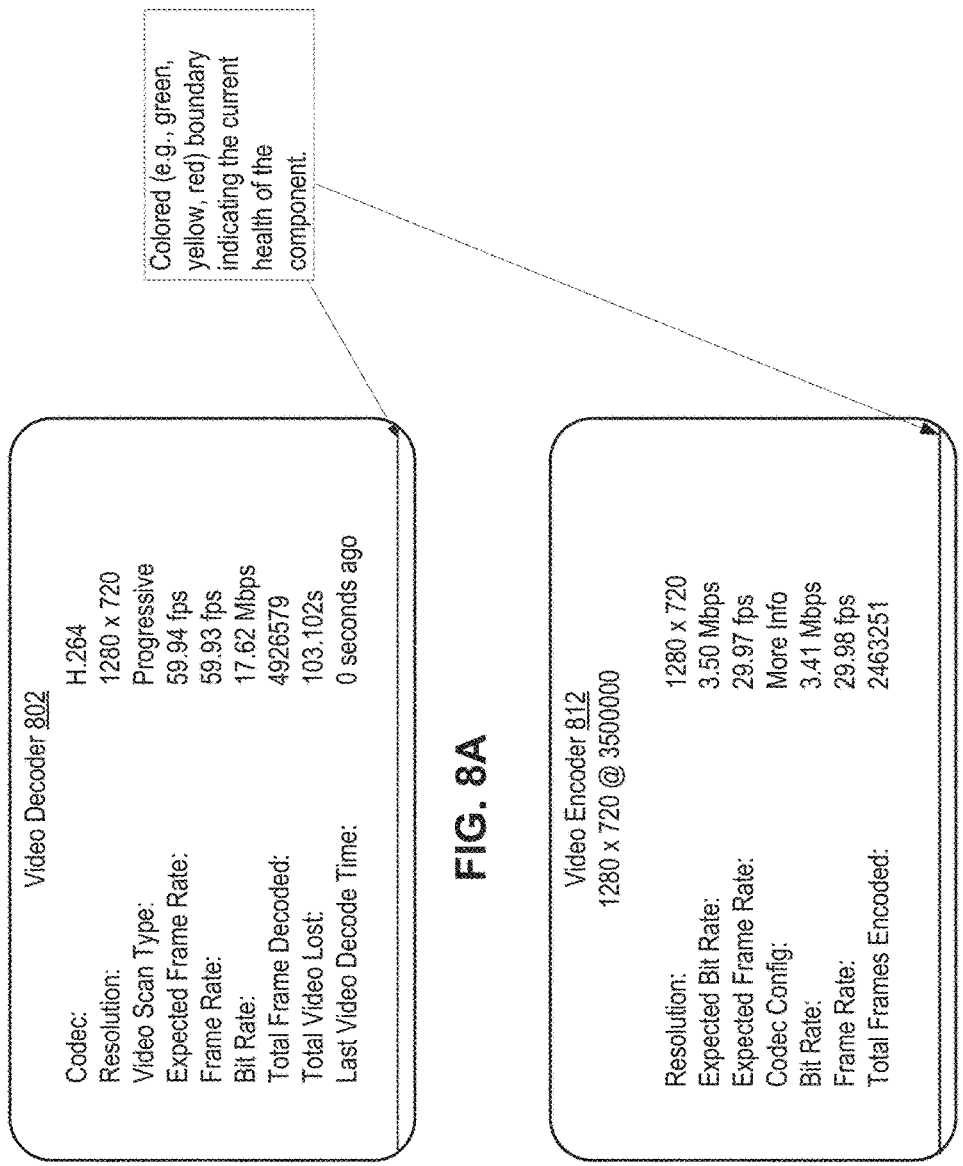

FIG. 8A

Video Decoder 802
Codec: H.264
Resolution: 1280 x 720
Video Scan Type: Progressive
Expected Frame Rate: 59.94 fps
Frame Rate: 59.93 fps
Bit Rate: 17.62 Mbps
Total Frame Decoded: 4926579
Total Video Lost: 103.102s
Last Video Decode Time: 0 seconds ago

FIG. 8B

Video Encoder 812
1280 x 720 @ 3500000
Resolution: 1280 x 720
Expected Bit Rate: 3.50 Mbps
Expected Frame Rate: 29.97 fps
Codec Config: More Info
Bit Rate: 3.41 Mbps
Frame Rate: 29.98 fps
Total Frames Encoded: 2463251

Colored (e.g., green, yellow, red) boundary indicating the current health of the component.

| Workflow ID | Severity | Component | Description | Time |
|---|---|---|---|---|
| Channel A | Failure | HdsPackager:Publisher | Failure to Connect. Uri: http://prim.ingest.istream2-live | 04/08/2015 1:21 PM |
| Channel B | Information | Audio:AudioDecoder | End of audio source loss. Time period 12.979s. | 04/08/2015 12:46 PM |
| Channel B | Information | Video:VideoDecoder | End of lost video signal slate. Time period 12.094s. | 04/08/2015 12:46 PM |

FIG. 9

REAL-TIME ANOMALY MITIGATION IN A CLOUD-BASED VIDEO STREAMING SYSTEM

RELATED APPLICATIONS

This application is related to U.S. Application Ser. No. 14/708,128 filed May 8, 2015 (now U.S. Pat. No. 9,407,944 issued Aug. 2, 2016); U.S. Application Ser. No. 14/708,135 filed May 8, 2015 (now U.S. Pat. No. 9,344,751 issued May 17, 2016); and U.S. Application Ser. No. 14/708,139 filed May 8, 2015 (now U.S. Pat. No. 9,686,576 issued Jun. 20, 2017), which are incorporated herein by reference.

FIELD OF INVENTION

The embodiments of the invention are related to the field of delivering media contents over a cloud computing environment. More specifically, the embodiments of the invention relate to methods and systems for anomaly mitigation in a cloud-based video streaming system.

BACKGROUND

Cloud computing is now ubiquitous in both enterprise and consumer settings. In cloud computing, data and applications are accessed over the Internet instead of requiring local storage and compute resources, and instead of owning all the hardware where the data resides and the software applications execute, an enterprise or a consumer (the "client" or "tenant") utilizes hardware and software resources supplied by a cloud computing provider to store the data and run the applications. Relying on sharing of resources among numerous clients, the cloud computing infrastructure (sometimes referred to as Infrastructure as a service (IaaS)) satisfies elastic demand spikes and achieves economies of scale thus becoming popular in various industries. In an IaaS model, computing resources are often offered as a number of virtual machines to a client requesting computing resources, and a hypervisor manages the offered virtual machines.

For media content processing, a video streaming system may utilize the cloud computing infrastructures offered by the cloud computing providers to provide services to a client. An operator of the video streaming system often is not the cloud computing providers. Thus a client may reach a service level agreement (SLA) with the operator of the video streaming system, and the operator of the video streaming system leases computing resources within the cloud computing infrastructures to process media contents from the client. Preferably the operator of the video streaming system can detect issues while utilizing the cloud computing infrastructures to process the media contents, thus mitigating them in real-time so that end user's experience is not affected.

Traditional network management/monitoring tools do not work well in this kind of applications. For example, simple network management protocol (SNMP) may provide management information to a management system, which determines if the system operates in a normal condition. However, management using a SNMP and other generic network management protocols are not tailored to video processing, which typically requires a high level of SLA (e.g., 99.9% availability or higher) thus the management/monitoring needs to detect issues and mitigate the issues quickly, and they do not have sufficient knowledge of the video processing for this kind of application in a cloud environment.

SUMMARY

A method for anomaly mitigation in a cloud-based video streaming system is disclosed. The method starts with receiving performance data from a set of workers of the video streaming platform, where each worker in the set of workers executes tasks in a task graph of a media workflow created for a video source, where the performance data from each worker is generated during execution of the worker, and where the performance data is indicative of operational status of the set of workers. The method continues with processing the performance data at the central telemetry system, where the processing includes generating task-specific monitoring data based on the performance data. The method continues with identifying at the central telemetry system whether the performance data or the task-specific monitoring data contains any anomaly; and upon an anomaly being identified, mitigating the anomaly by interacting with the set of workers.

An electronic device for anomaly mitigation in a cloud-based video streaming system is disclosed. The electronic device serves as a central telemetry system in a video streaming platform, and it contains a processor and a non-transitory machine-readable storage medium. The electronic device receives performance data from a set of workers of the video streaming platform, where each worker in the set of workers executes tasks in a task graph of a media workflow created for a video source, where the performance data from each worker is generated during execution of the worker, and where the performance data is indicative of operational status of the set of workers. The electronic device processes the performance data at the central telemetry system, where the processing includes generating task-specific monitoring data based on the performance data; identifies at the central telemetry system whether the performance data or the task-specific monitoring data contains any anomaly; and upon an anomaly being identified, mitigates the anomaly by interacting with the set of workers.

A non-transitory machine-readable storage medium for anomaly mitigation in a cloud-based video streaming system is disclosed. The non-transitory machine-readable storage medium has instructions stored therein, which when executed by a processor, cause the processor to perform operations in an electronic device serving as a central telemetry system in a video streaming platform. The operations include receiving performance data from a set of workers of the video streaming platform, where each worker in the set of workers executes tasks in a task graph of a media workflow created for a video source, where the performance data from each worker is generated during execution of the worker, and where the performance data is indicative of operational status of the set of workers. The operations continue with processing the performance data at the central telemetry system, where the processing includes generating task-specific monitoring data based on the performance data. The operations continue with identifying at the central telemetry system whether the performance data or the task-specific monitoring data contains any anomaly; and upon an anomaly being identified, mitigating the anomaly by interacting with the set of workers Embodiments of the disclosed techniques effectively detect and mitigate anomalies in a video streaming system. The disclosed detection and mitigation techniques utilize task-specific monitoring data generated during execution of a media workflow, and since the information pinpoints the operational status of the components involved during the execution of the media workflow, the detection and mitigation is efficient for a cloud-based video streaming system.

BRIEF DESCRIPTION OF THE DRAWINGS

FIG. 8A illustrates an operational status of a media workflow at a video decoder according to one embodiment of the invention.

FIG. 8B illustrates an operational status of a media workflow at a video encoder according to one embodiment of the invention.

FIG. 9 illustrates portions of a graphic user interface (GUI) providing notification for anomalies of a set of media workflows according to one embodiment of the invention.

DETAILED DESCRIPTION

Figure 1:
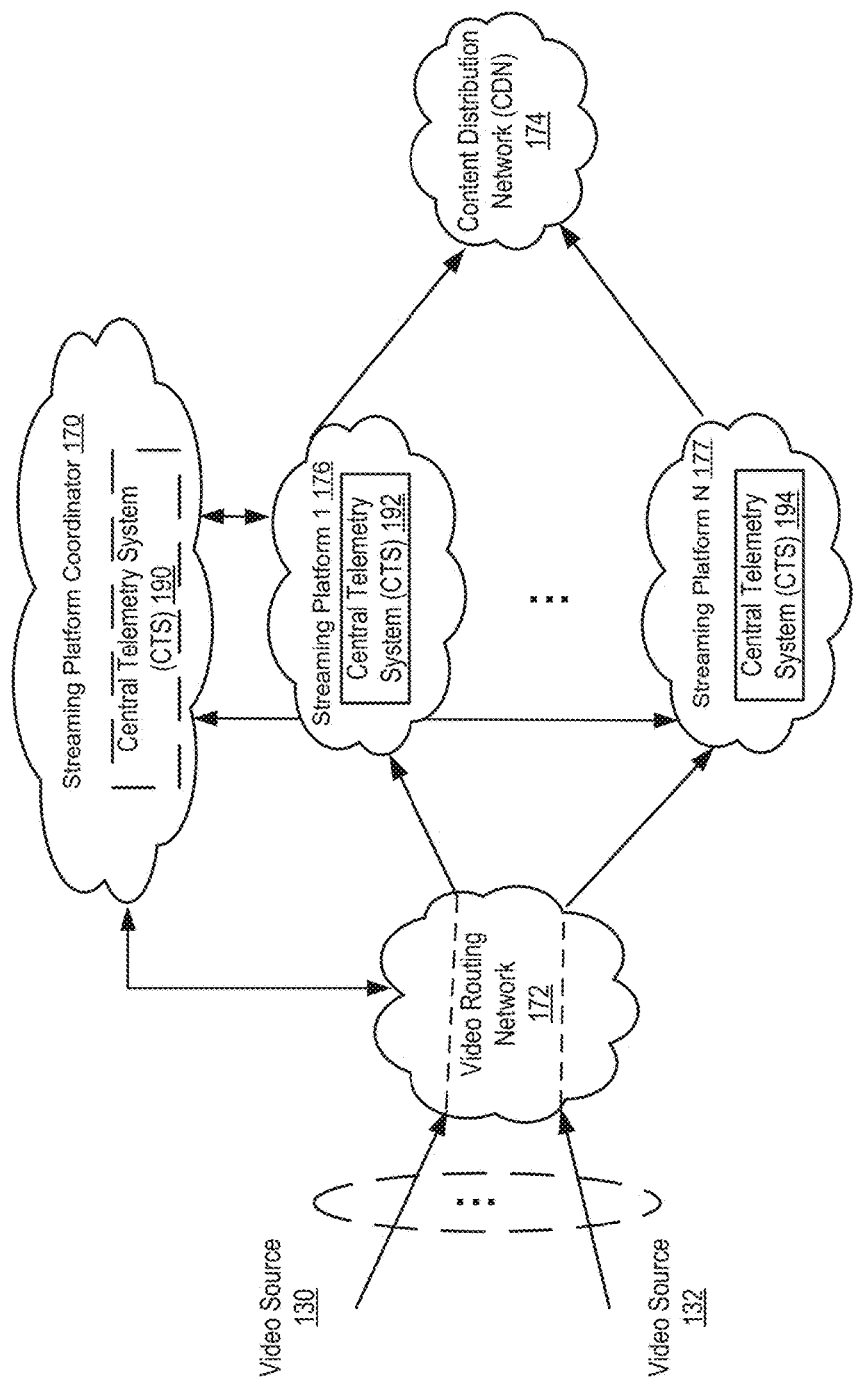
FIG. 1 illustrates a video streaming system containing multiple video streaming platforms according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

FIG. 1 illustrates a video streaming system containing multiple video streaming platforms according to one embodiment of the invention. A video streaming system 100 includes a video routing network 172, multiple video streaming platforms represented by a streaming platform 1 and a streaming platform N at references 176 and 177, a content distribution network 174, and a streaming platform coordinator 170.

The video routing network 172 routes video sources 130 and 132 to different video streaming platforms. The video routing network 172 communicates with the streaming platform coordinator 170, which may request the video routing network 172 to route the video sources 130/132 to one or more specific video streaming platforms at a specific time.

The streaming platform coordinator 170 also communicates with all the video streaming platforms including the streaming platforms 1 and N. The streaming platform coordinator 170 coordinates processing of the media contents routed to the various video streaming platforms. The processed media contents from the video sources are then published to the content distribution network 174.

It is to be noted that the various video streaming platforms and/or the streaming platform coordinator may be hosted by various cloud computing providers such as Amazon.com®, Microsoft®, Google®, CenturyLink®, Rackspace®, or Computer Sciences Corporation (CSC®). When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain a central telemetry system, which is illustrated as a central telemetry system 192/194 at streaming platform 1/N respectively. The central telemetry system is to monitor for and mitigate anomalies arisen from processing media workflows created for video sources in a video streaming platform as discussed in more details herein below. Additionally/alternatively, the streaming platform coordinator 170 may contain a central telemetry system 190 that similarly monitors for anomalies arisen from processing media workflows in all video streaming platforms the streaming platform coordinator 170 interacts with, and the streaming platform coordinator 170 may mitigate the anomalies through coordinating resources at different video streaming platforms.

Video Streaming Platform in a Cloud Computing Environment

Figure 2:
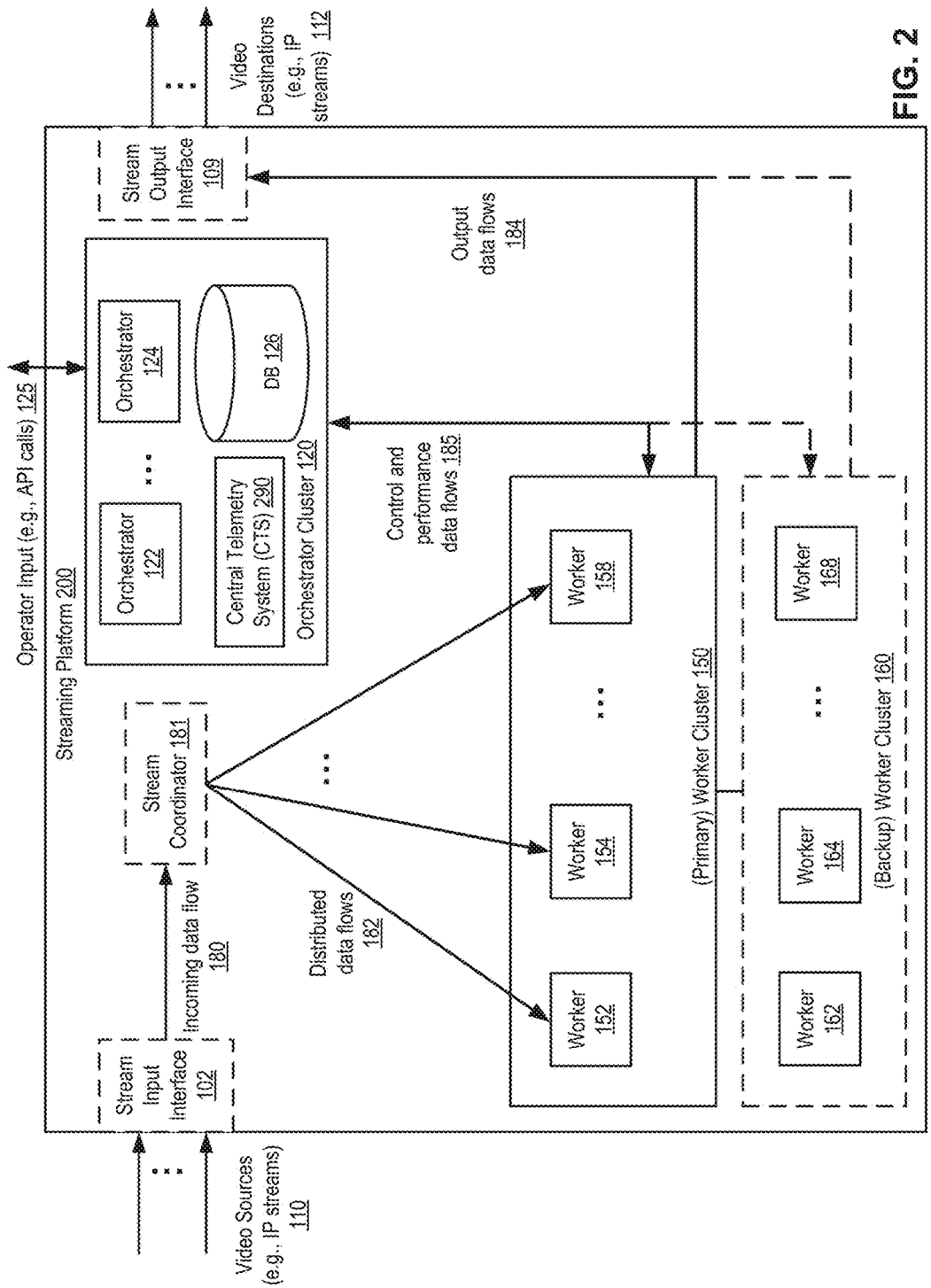
FIG. 2 illustrates a video streaming platform in a cloud computing environment according to one embodiment of the invention.

A video streaming platform is a main component of a video streaming system as illustrated in FIG. 1. The architecture of the video streaming platform and its operations thus warrant a more detailed discussion. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD). In one embodiment, the video sources 130 and/or 132 that are routed through the video routing network 172 in FIG. 1, and they become the video sources 110 after they are processed in the video routing network 172 (e.g., adding/removing metadata in packet headers of the video sources).

A video source may be "pushed" to the streaming platform 200 where the video source is IP packet streams such as the Moving Picture Experts Group (MPEG)-transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

It is to be noted that orchestrator cluster 120 also contains a central telemetry system (CTS) 290. The central telemetry system monitors the workers in the streaming platform 200 through collecting performance data from the workers (e.g., the performance data collected along with the control flows, as the control and performance data flows illustrated at reference 185) and determines if any anomaly is detected. When an anomaly is detected, the central telemetry system 290 performs mitigation and/or provides notification (e.g., to an operator of the streaming platform 200 and/or to a streaming platform coordinator). While the central telemetry system 290 is illustrated a standalone entity of the orchestrator cluster 120, the central telemetry system 290 may be integrated with other entities such as orchestrators 122-124. Additionally, a portion of the central telemetry system 290 may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Figure 3A:
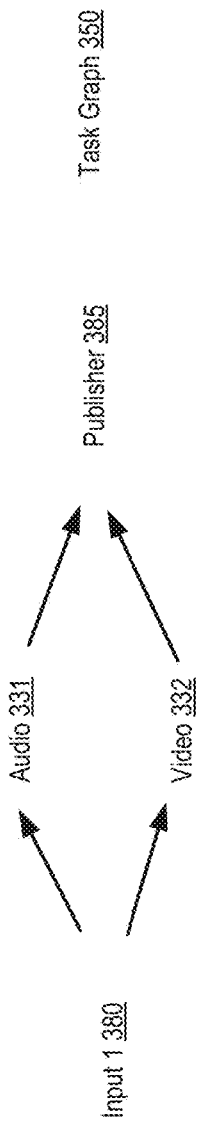
FIG. 3A illustrates an exemplary task graph according to one embodiment of the invention.

FIG. 3A illustrates an exemplary task graph according to one embodiment of the invention. Task graph 350 contains one input node, an input 1 at 380. The input 1 represents an input processing task (sometimes referred to as an ingest task), which is to receive and prepare the video source for further processing. The output of the input 1 is sent to an audio 331 and a video 332. The nodes of the audio 331 and video 332 represent processing tasks associated with the respective audio and video layers of the video source. After the audio and video are processed through transcoding operations at 331-332 (sometimes referred to as audio transcoding and video transcoding respectively), the outputs are sent to a publisher 385, where the processing task is to publish the processed video source in desired output format(s) to the desired destination(s). While the majority of the nodes of task graph 350 only have a single input and/or a single output, the layout is for simplicity of illustration. A task graph may contain tens or even hundreds of nodes, and each node may have multiple inputs and multiple outputs.

Figure 3B:
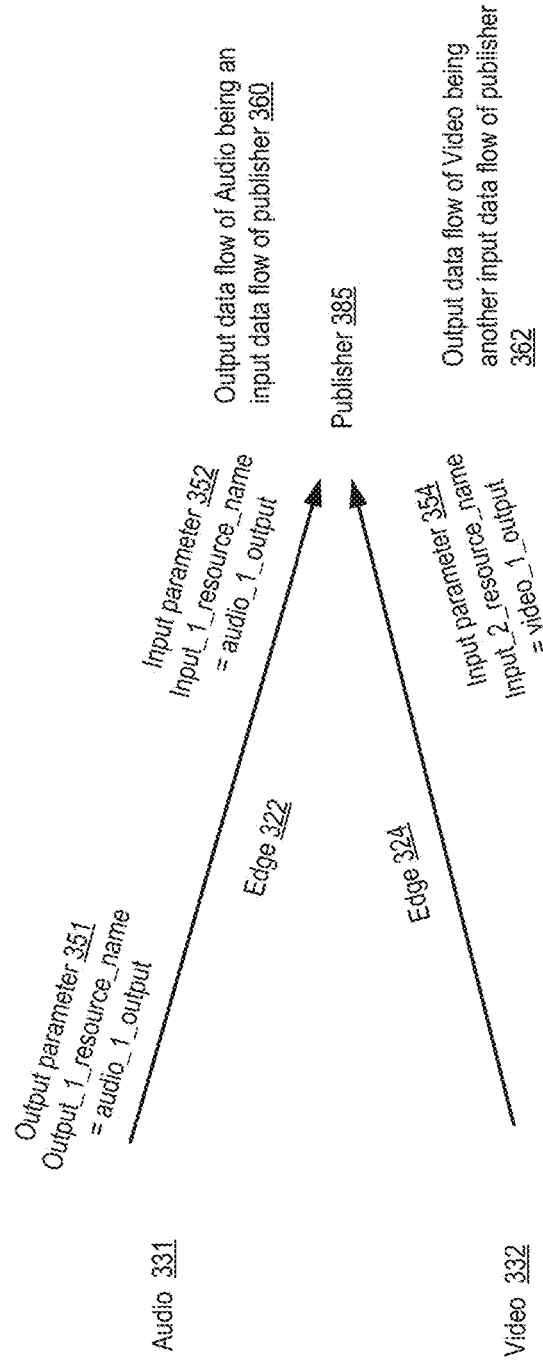
FIG. 3B illustrates the relationship between adjacent nodes in a portion of a task graph according to one embodiment of the invention.

FIG. 3B illustrates the relationship between adjacent nodes in a portion of a task graph according to one embodiment of the invention. The illustrated portion of the task graph is a portion of task graph 350 in FIG. 3A, and the illustrated portion includes the audio 331, the video 332, the publisher 385, and edges 222-224. The Audio 331 produces one output. The output contains an output parameter 351, which is referred to by an output resource name (output_1_resource_name) and the value is audio_1_output. Represented by the edge 322, the output of the audio 331 is an input of the publisher 385, and that input contains an input parameter 352, which is referred to by an input resource name (input_1_resource_name), and the value of the input parameter to the publisher 385 is the same as the value of the output parameter 351, audio_1_output. Similarly, the video 332 produces an output containing an output parameter 353, which is referred to as output_1_resource_name, and the value is video_1_output.

The output of the video 332 is another input of publisher 385, and that input contains an input parameter 354, which is referred to by input_2_resource_name and its value is the same (video_1_output).

It is to be noted that while the input and output parameters in the example are single values respectively, some edges of a task graph may contain a plurality of input parameters and/or a plurality of output parameters, in which case the input parameters and output parameters are referred to as the input parameter set and the output parameter set respectively. Each of the input and output resource names represents resource(s) involved for the respective inputs and outputs. The reading and writing of the inputs and outputs are done via application programming interface (API) calls to a service called the segment store that runs on every worker in one embodiment.

It is also to be noted that each node in a task graph represents a task to be performed by a worker in a video streaming platform such as the streaming platform 200. In some embodiments, all the tasks in the task graphs may be performed by a single worker. The single worker may be implemented in a virtual machine by a computing device with a more powerful processor such as an Intel® Haswell processor with 18+ cores, or it may be implemented in a virtual machine by a computing device with an aggregation of less powerful processors such as a set of Intel® Xeon E3-1200 processors assembled in a compact rack. In some embodiments, the single worker is implemented by a computing device with an integrated graphic processor unit (GPU).

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing.

Referring back to FIG. 2, the streaming platform 200 receives operator input 125 to the orchestrator cluster 120. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 125 may also from an operator separately from the streaming platform coordinator 170. The operator input may be in the form of API calls. One of the requests from the streaming platform coordinator is a request create a workflow for a video source in the streaming platform 200. The request (may be referred to as a channel creation request) may contain a variety of parameters describing the video source and the expected operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Microsoft© PlayReady, Adobe© Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft® smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

Operations of Anomaly Mitigation in a Video Streaming Platform

Figure 4:
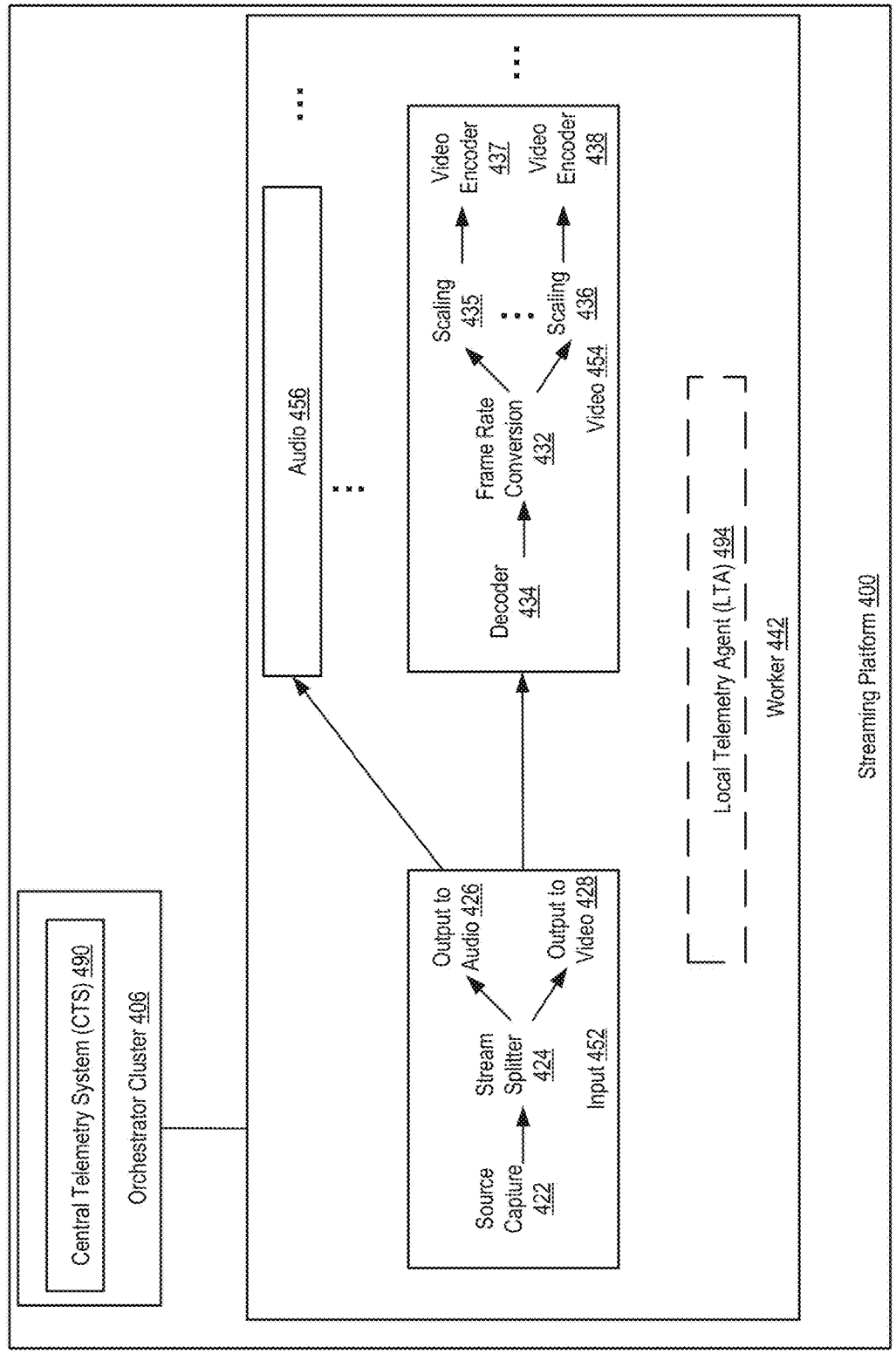
FIG. 4 illustrates functional blocks to mitigate anomalies in a video streaming platform according to one embodiment of the invention.

FIG. 4 illustrates functional blocks to mitigate anomalies in a video streaming platform multiple according to one embodiment of the invention. A streaming platform 400 is a video streaming platform, similar to the streaming platform 200 illustrated in FIG. 2, Certain aspects of FIG. 2 have been omitted from FIG. 4 in order to avoid obscuring other aspects of FIG. 4.

The streaming platform 400 contains a worker 442 and an orchestrator cluster 406. The streaming platform 400 contains other workers too, but they are omitted for clarity of explanation. Similar to FIG. 2, the orchestrator cluster 406 contains a central telemetry system (CTS) 490, which performs the tasks of monitoring for and mitigating any anomaly of the worker. Within the worker 442, a local telemetry agent (LTA) 494 is an entity to collect performance data within the worker 442. The functional module LTA 494 may be integrated within the worker 442, but it may also be a processing unit independent from the worker 442, e.g., it may be implemented in a virtual machine by a computing device with a processor and collect performance data from a set of workers. In one embodiment, the local telemetry agent (LTA) 494 is just a logical function, and the collection of the performance data is sent directly from the worker to the central telemetry system 490 thus there is no module for data collection at a worker.

Within the worker 442, the tasks of a task graph are illustrated in further details. For example, an input 452, which is similar to input 1 at reference 380 in FIG. 3A, is illustrated as containing four processing blocks performing tasks of a task graph for a media workflow. A source capture 422 captures video sources coming to the streaming platform 400 (such as video sources 110). The captured video sources are converted to one or more streams at a stream splitter 424, and the streams are then split to an output to audio 426 and output to video 428, which are responsible to output the streams to an audio node 456 (similar to the audio node 331 in FIG. 3A) and a video node 454 (similar to the video node 332 in FIG. 3A).

A data stream then inputs to the video node 454. The video node 454 contains more processing blocks performing tasks of the task graph for the media workflow. The data stream is decoded first at a decoder 434, and the decoded data stream are converted to a different frame rate at a frame rate conversion 432 when needed. The data streams are then split and transmitted to different scaling units such as scaling 435 and 436, and the scaled data streams are then encoded again at video encoders such as video encoders 437 and 438. The encoded data stream are then published at publisher(s)

(not illustrated). It is to be noted that while only the nodes of input and video in a task graph created for a media workflow are expanded to illustrate individual processing blocks within, other nodes in the task graph contain similar/other more processing blocks within as well. For performance monitoring and anomaly mitigation of a media workflow, the individual processing blocks involved are known and performance data are collected from these individual processing blocks.

As illustrated, a media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone mitigate any anomaly detected with regard to the processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder 434, frame rate conversion 432, scaling 435/436, and/or video encoders 437/438), thus cannot provide effective mitigation.

Figure 5:
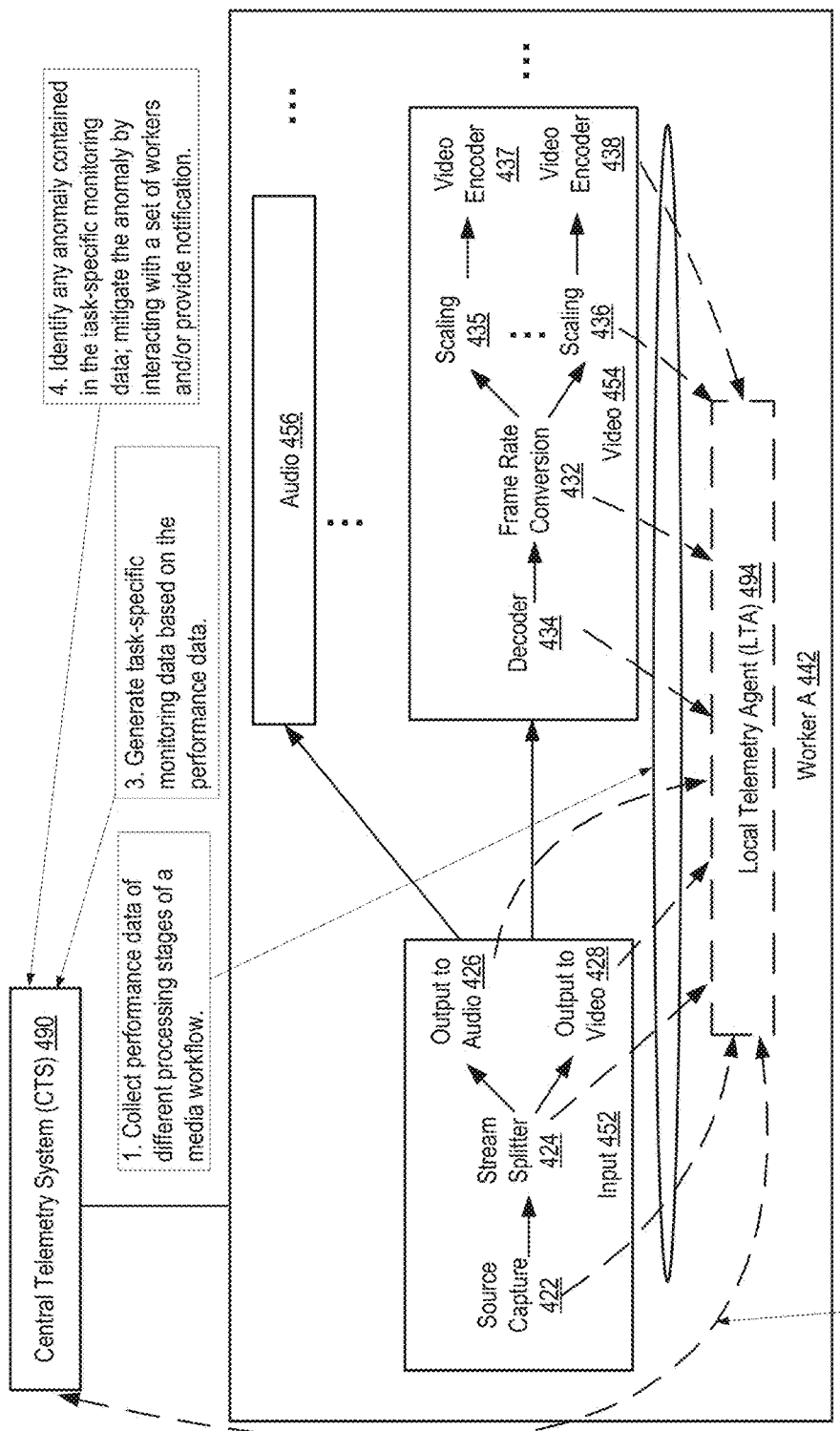
FIG. 5 illustrates mitigating anomalies in a video streaming platform according to one embodiment of the invention.

FIG. 5 illustrates mitigating anomalies in a video streaming platform according to one embodiment of the invention. FIG. 5 is similar to FIG. 4, and the same or similar references indicate elements or components having the same or similar functionalities. Task boxes 1 to 4 illustrate the order in which operations are performed according to one embodiment of the invention.

At task box 1, the local telemetry agent LTA 494 collects performance data from different processing blocks at different processing stages. These processing blocks process components of tasks of a media workflow, and generate a variety of performance data such as the bit rate of the data stream, total bytes received, and total bytes lost. It is to be noted that the performance data are from individual processing blocks (e.g., the source capture 422, the stream splitter 424, and others illustrated in FIG. 5), so that the performance data is to capture the performance of individual processing blocks in processing tasks of the media workflow. The performance data may also include ones corresponding to tasks or to the whole media workflow. For example, the performance data may include processor (e.g., CPU/GPU) usages and/or memory usage of the media workflow. Additionally, the performance data may include ones corresponding to the worker executing the media workflow, as discussed in more details herein below.

At task box 2, these performance data are transmitted to the central telemetry system 490. As noted herein above, when the local telemetry agent 494 is not implemented, these performance are transmitted directly from the different processing blocks in the worker to the central telemetry system 490. The transmission may be triggered in a variety ways. The transmission may be scheduled so that the performance data are transmitted periodically without a request from the central telemetry system 490. The transmission may be in response to an inquiry by the central telemetry system 490. In addition, the transmission may be in response to an event at the worker (e.g., a worker restart, a task restart, a performance counter reaching a threshold).

At task box 3, the central telemetry system 490 generates task-specific monitoring data based on the performance data. The task-specific monitoring data is generated by processing the performance data. The processing includes:
(1) Error smoothing. A simple error smoothing process is to average the presently collected performance data with previous collected performance data (e.g., a bit rate can be averaged through a sliding window). More complicated smoothing processes include using smoothing algorithms such as Additive smoothing and Exponential smoothing.
(2) Data accumulating. The presently collected performance data may be added to previous collected performance data to obtain the derived task-specific monitoring data. For example, the total frame encoded/decoded may be computed by adding the previously collected data with the newly received.
(3) Data synthesis. Synthesizing collected different performance data to derive task-specific monitoring data. For example, a task-specific monitoring data such as total video/audio lost will be the sum of the lost frames/time periods at the video/audio nodes of a task graph. The synthesis may use previously collected performance data too. Data synthesis may generate new data type that is not part of the collected performance data.

It is to be noted that the processing list above is not meant to be an exclusive list of operations that can be done to generate task-specific monitoring data based on the performance data.

At task box 4, the central telemetry system 490 identifies any anomaly contained in the task-specific monitoring data, and then mitigates the identified anomaly by interacting with a set of workers and/or provide notification. The identification of anomaly will be discussed in more details in relation to FIG. 6.

Once an anomaly is detected, a central telemetry system will try to mitigate the anomaly. The mitigation can be done in a variety of ways, depending on the type and severity of the anomaly. The central telemetry system can cause a task to be restarted, a media workflow (channel) to be restarted, and a worker to be restarted.

Additionally, the central telemetry system may cause a worker to be disabled and all the media workflows assigned to the worker to be moved to another worker. It may also cause a particular media workflow to be moved to another worker. For example, as illustrated in FIG. 2, a set of workers are in the primary worker cluster 150 and another set of workers are in the backup worker cluster 160. The central telemetry system 290 may work with orchestrators 122/124 and force a failover from a worker (e.g., worker 152) in the primary worker cluster 150 to another worker (e.g., worker 162) in the backup worker cluster 160, so that the media workflows originally processed in the primary worker cluster 150 are processed in the backup worker cluster 160. Furthermore, a central telemetry system may cause a media workflow to be processed in a different video streaming platform. For example, when a media workflow is redundantly processed in two or more video streaming platforms, a central telemetry system such as central telemetry system 190 in the streaming platform coordinator 170 in FIG. 1 may cause the media workflow to be processed in the video streaming platform serving in a backup role.

It is to be noted that the mitigation can be adjusted based on the previous mitigation results. For example, when a previous mitigation was deemed insufficient to mitigate a particular anomaly or the previous mitigation caused more service disruption than necessary, the result may be fed back to the central telemetry system and the central telemetry system may adjust the mitigation actions for the particular anomaly in the future.

The central telemetry system may also provide notification of the anomaly. The anomaly notification may include at least two types. One type of notification is to indicate that anomaly is occurring. The anomaly may be sent to the operator of the video streaming platform so that the operator may intervene and provide suitable mitigation. Another type of notification is to inform the operator a result of mitigation operations when the mitigation operations are triggered by the central telemetry system to mitigate a certain anomaly.

Figure 6:
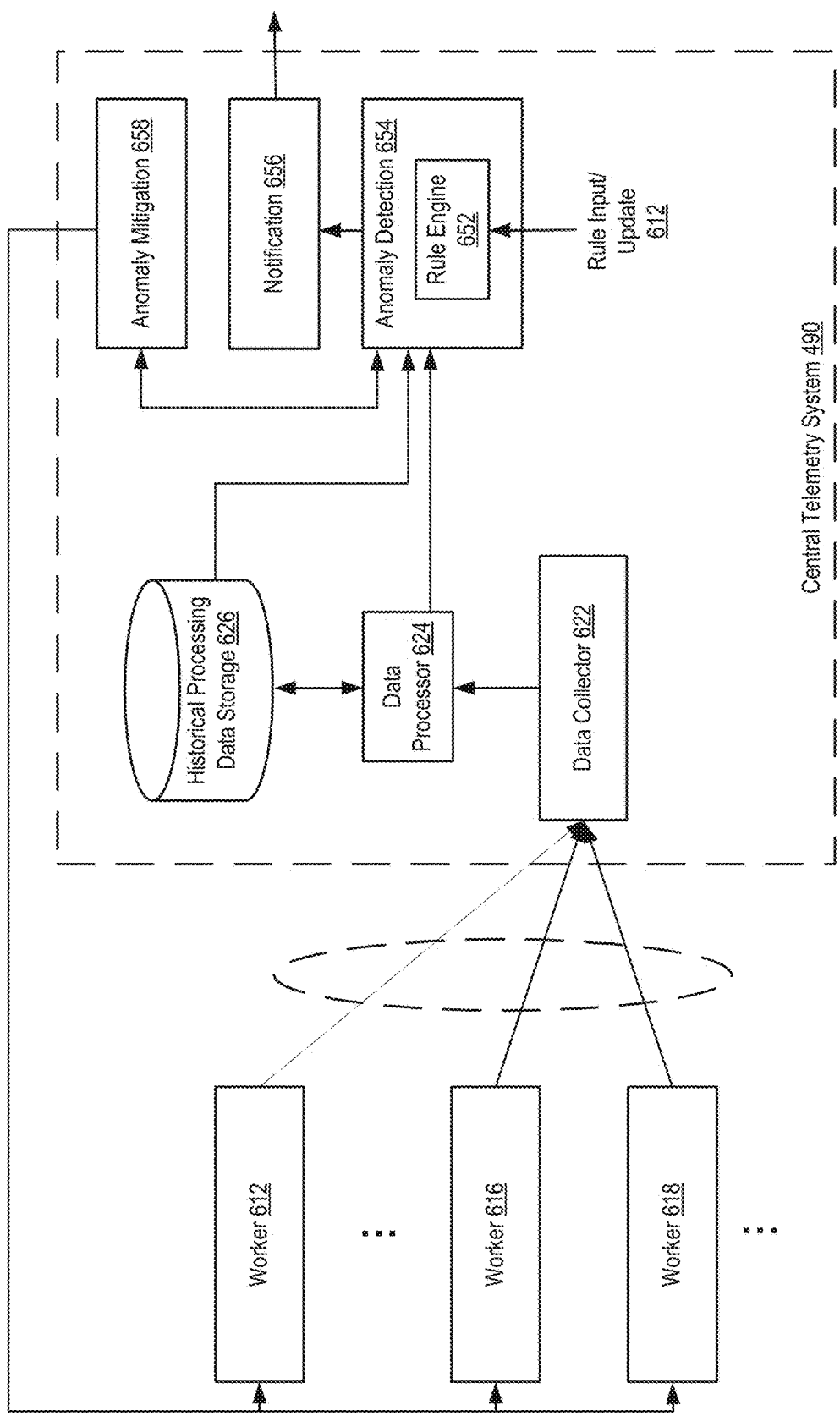
FIG. 6 illustrates functional blocks for mitigation/notification in a central telemetry system according to one embodiment of the invention.

As discussed, the mitigation/notification in a central telemetry system are a major part of the anomaly mitigation system. FIG. 6 illustrates functional blocks for mitigation/notification in a central telemetry system according to one embodiment of the invention. The central telemetry system 490 contains a data collector 622, a data processor 624, a historical processing data storage 626, an anomaly detection module 654, notification module 656, and anomaly mitigation module 658. One or more of the modules may be integrated together, and one or more modules may be integrated with other modules not illustrated. In some embodiments, one or more modules contain their respective processors.

The data collector 622 collects performance data from a set of workers, workers 612-618 in this example. A central telemetry system may contain multiple data collectors, and each is responsible to collect performance data from a set of workers so that performance data from all the workers may be collected by the central telemetry system. As discussed herein above, the performance data includes data produced while a worker processes a media workflow. The data may be a specific media workflow event (e.g., failure of the decoder 434 during processing a media workflow) or a counter specifically for a task within a media workflow (e.g., the number of frames encoded for the media workflow at the video encoder 437). In addition to the events and counters related to specific task execution of a media workflow, performance data may also include events and counters related to the whole media workflow, including the processor/memory usage of individual tasks and/or media workflows. The information is often desirable for a client of the video streaming platform as the client may prefer the visibility at the media workflow level. The performance data collected from performing specific tasks within a media workflow and from executing a media workflow are generally cannot be collected via traditional means (e.g., a network management protocol such as SNMP) as it requires knowledge of the media workflow and its task graph, and we may refer these data as workflow performance data. Proper collection of workflow performance data is required in order to rapidly and effectively mitigate and provide clear notifications concerning anomalies pertaining to specific tasks or portions of tasks within the media workflow.

Furthermore, the performance data may also include data beyond individual media workflows, such as processor/memory usage of a worker or the VM hosting the worker. The performance data for the worker may be the result of executing tasks of a plurality of multiple media workflows. The performance data here may be collected via traditional means, and we may refer these data as platform performance data as the performance data are from the platform on which the media workflows are executed.

The performance data collected by the data collector 622 is processed by the data processor 624. The data processor 624 generates task-specific monitoring data based on the workflow performance data. The data processor 624 may perform error smoothing, data accumulation, and/or data synthesis as discussed herein above in relation to FIG. 5. It is to be noted that the workflow performance data and platform performance data may be processed separately at the data processor 624. The data processor 624 may process platform performance data through error smoothing and data accumulation, and the resulting platform performance data may be referred to as refined platform performance data. The data processor 624 may also synthesize workflow performance data and platform performance data, and the resulting data is still considered task-specific monitoring data.

During the process of the performance data, the data processor 624 may retrieve historical data from the historical processing data storage 626, which is a database in one embodiment. The historical processing data storage 626 may include performance data stored within from earlier data collection, which was sent to the data processor 624 and passed on to the historical processing data storage 626. The historical performance data may be used in error smoothing, data accumulation, and/or data synthesis. Similarly, the earlier generated task-specific monitoring data may also be stored in the historical processing data storage 626. The historical task-specific monitoring data may also be used in error smoothing, data accumulation, and/or data synthesis.

The task-specific monitoring data generated may be based on characteristics of individual media workflow. For example, for a media workflow that comes from a time sensitive video source (e.g., live sporting events), more task-specific monitoring data may be generated to track frame delays at various processing blocks when the task graph of the media workflow is processed in a worker. The processing mechanism (e.g., error smoothing, data accumulation, and/or data synthesis) and the amount of historical data used (e.g., historical data in the last few seconds, minutes, hours, etc.) to generate a particular type of task-specific monitoring data is determined by the rule engine 652, which will be discussed in more details herein below.

The task-specific monitoring data, along with the refined platform performance data, are further processed at the anomaly detection module 654. The anomaly detection module 654 analyzes the received data and determines if there is any anomaly in the data. The analysis is rule based in one embodiment, and the anomaly detection module 654 obtains the rules from a rule engine 652.

The rule engine 652 includes several sets of rules. One set is for processing performance data, and it determines how the task-specific monitoring data is to be generated based on the performance data. Another set is for anomaly detection 654, and it determine if an anomaly exists in the analyzed data, and if so, the severity of the anomaly. Another set is for notification, and it is for determining the severity of alarm and what alarm to be reported. Another set is for anomaly mitigation, and it is for determining the remedial measures to be taken for specific anomalies. The rule engine 652 are accessible by the data processor 624, the anomaly detection module 654, the notification module 656, and the anomaly mitigation 658 for them to utilize these sets of rules. In one embodiment, the rule engine 652 is located in one of the functional boxes (e.g., within the anomaly detection module 654 as illustrated); in an alternative embodiment, the rule engine 652 are distributed among the multiple functional boxes, e.g., separate rule engines, each including corresponding sets of rules, are coupled to or stored within the data processor 624, the anomaly detection module 654, the notification module 656, and anomaly mitigation module 658.

The rules may be input and updated from reference 612. The rules may also be updated based on feedback from the data processor 624, the anomaly detection module 654, the notification module 656, and/or the anomaly mitigation module 658. The rules within the rule engine 652 may include a set of thresholds, crossing of which will be deemed anomaly. The set of thresholds may also include severity indications such as information, minor, major, and critical. For example, crossing a lower threshold may be considered minor while crossing the highest threshold may be considered critical.

The determined anomaly may be error conditions that require immediate remedial measures, and these error conditions will be designated with a higher severity. The determined anomaly may also be merely deviations from normal patterns for the task-specific monitoring data, and the deviations may not currently impact a worker's performance. However, based on a predictive model, the anomaly detection 654 may determine that certain remedial measures should be taken to avoid future performance deterioration of a worker. There are a variety of predictive models applicable for anomaly detection, such as Naive Bayes, Random Forests, and K-nearest neighbor algorithm. A set of thresholds may be set for the predictive modeling to predict future performance deterioration thus cause remedial measures taken.

The determination of anomaly may be based on characteristics of individual media workflows, and the same data from different media workflows may result in the anomaly detection 654 determining one has an anomaly while the other operates normally. For example, for a media workflow where its input video source (e.g., a video source coming to the source capture 422) is known to be lower quality and the SLA for the video source is not high, the rule for anomaly detection may determine the media workflow healthy, even if some frames are lost during processing the media workflow. At the same time, other media workflow with the same amount of frame lost will be determined abnormal and remedial measures need to be taken. In other words, a threshold crossing for the same measure (frame lost in this example) may trigger the central telemetry system to declare failure for one media workflow but not for the other.

Based on the data from the data processor 624 and the rules in the rule engine 652, the anomaly detection module 654 may determine the existence of an anomaly in one or more media workflows. The notification module 656 then outputs notification of the anomaly. The notification may be sent to an operator of the video streaming platform where the central telemetry system 490 resides, and it may be sent to a streaming platform coordinator. The notification includes at least one of the severity of the anomaly, the task experiencing the anomaly, and the worker experiencing the anomaly in one embodiment.

The notification may aggregate and consolidate anomalies determined by the anomaly detection module 654 so that no duplicated notifications are sent out. The notification may be a visible/audible alert in the operator's management system, and it may be an API call into the operator's notification and incident/ticket system.

The notification may cause the operator and/or the streaming platform coordinator to perform external remedial measures to mitigate the anomaly. Alternatively or additionally, the anomaly mitigation module 658 performs remedial measures by interacting with a set of workers, including the worker from which the performance data associated with the anomaly is collected.

The remedial measures may only impact a media workflow such as restarting a task of the task graph created for the media workflow and restarting the media workflow. The remedial measures may also impact other media workflows sharing the worker such as restarting the worker, moving all tasks on the worker to another worker and preventing all tasks from running on the worker (often referred to declaring the worker "out of service"). The remedial measures may even move processing of a media workflow to a different video streaming platform.

It is to be noted that the anomaly detection, notification, and anomaly mitigation modules may utilize machine learning techniques, such as multiple layers of binomial linear discriminant analysis (e.g., logistic regression), multinomial logistic regression, neural net, decision tree/forest, or support vector machine. The machine learning techniques may be utilized in updating the rules in the rule engine 652. For example, the rule engine 652 may adjust its rules on how to derive task-specific monitoring data (what to collect and what mechanism to use and how to generate the task-specific monitoring data) based on the success or lack that of in detecting anomalies from the earlier generated task-specific monitoring data. The rule engine 652 may also adjust its rule on what should be deemed as anomaly and the severity of an anomaly. For example, a rule in the rule engine 652 indicating that a certain number of frame loss is acceptable at a decoder and no alarm/assert is raised for the associated decoder for a media workflow. The quality of the resulting video streams for the media workflow is the later deemed unacceptable at the content distribution network (e.g., CDN 174). The feedback will be returned to rule engine 652 at reference 612 and cause the rule to be updated. If the updated rule becomes too strict, and causes the anomaly mitigation 658 to restart the tasks at the decoder very frequently for the media workflow while the quality of the resulting video streams is acceptable, the rule engine 652 will get feedback from the anomaly mitigation 658 to relax the rules to reduce false alarms. The machine learning process operates continuously to make necessary adjustment on the various sets of rules in the rule engine 652 so that the data processor 624, the anomaly detection module 654, the anomaly mitigation module 658, and the notification module 656 work properly for various media workflows.

The central telemetry system is tailored toward processing of media workflows in a video streaming system. It offers contextual understanding of performance of workers in performing tasks in task graphs created for media workflows. The anomaly detection and the remedial measures can be coupled closely in the context of processing media workflows. For example, the failure of a publisher at a worker in a primary worker cluster will have a higher severity comparing to the failure of a publisher at a worker in the backup worker cluster, and the anomaly mitigation 658 will perform different remedial measures for the two scenarios. Additionally, the rules may be initially configured and input to the rule engine 652, and the rules may be set to match particular media workflows and video streaming platform. Then through machine learning, the rules may be updated to further adjust to the particular media workflow and the video streaming platform. The flexibility to adjust the rules make the central telemetry system applicable to a variety of video streaming platforms hosted by various cloud providers.

An Embodiment of a Central Telemetry System

Figure 7:
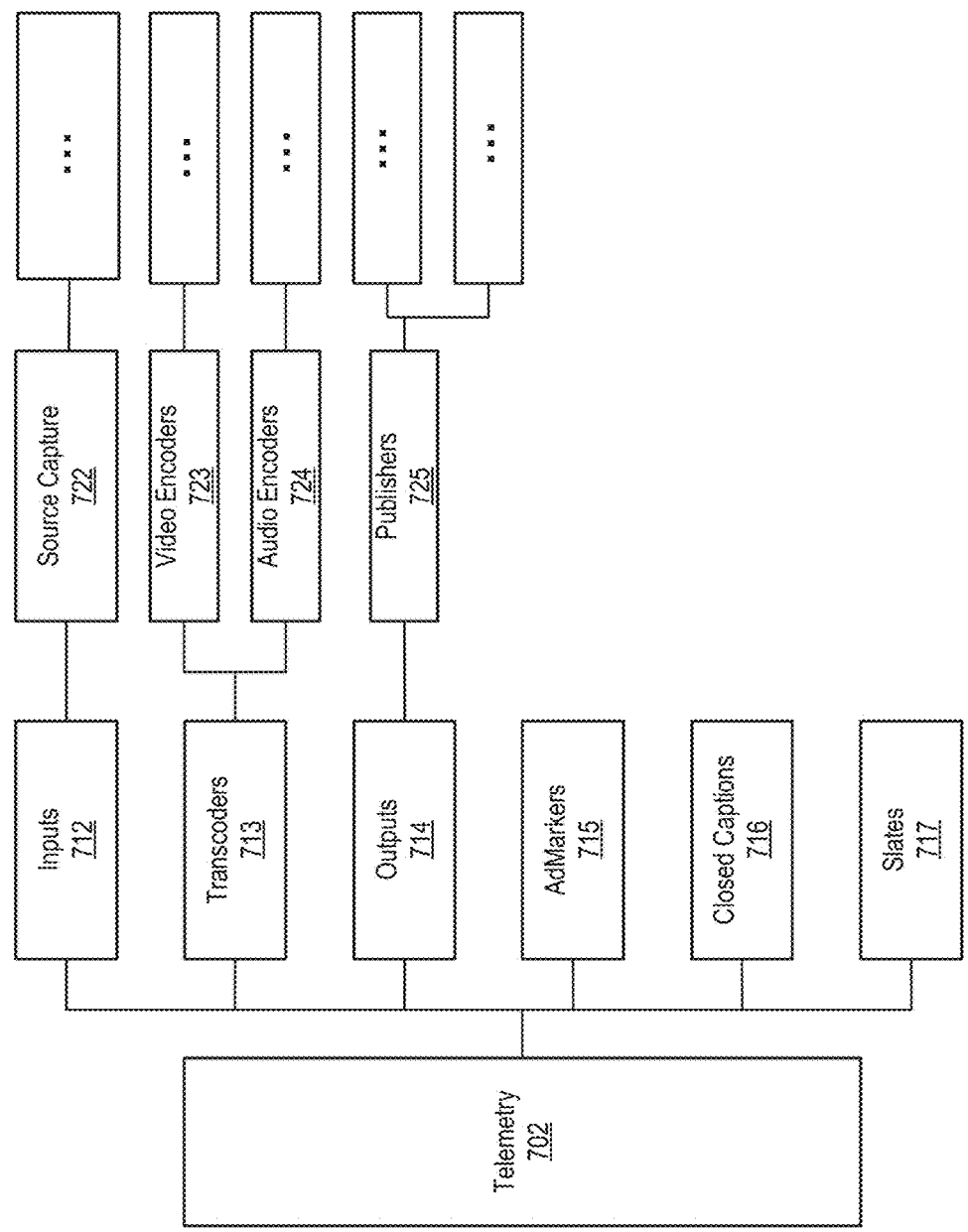
FIG. 7 illustrates processing blocks monitored by a central telemetry system according to one embodiment of the invention.

FIG. 7 illustrates processing blocks monitored by a central telemetry system according to one embodiment of the invention. The central telemetry system is telemetry 702, and it divides the processing blocks in six categories. Inputs 712 are for the ingestion of video sources; transcoders 713 are for transcoding video/audio sources; outputs 714 are for packaging and publishing the result of processing; ad markers 715 are for inserting advertisement in media workflows; closed captions 716 are for enabling closed captions for a media workflow; and slates 717 are for substituting static content within media workflows.

Each processing blocks may contain sub-blocks, for example, the inputs 712 include a source capture 722, similar to the source capture 422 in FIG. 4; transcoders 713 include video encoders 723 and audio encoder 724, and the video encoders 723 may include video encoders 437 and 438 in FIG. 4. It is to be noted that the illustrated processing blocks/sub-blocks are selected for explaining the disclosed embodiments only, and other processing blocks/sub-blocks in addition to and/or in place of the illustrated ones may be implemented in embodiments of the invention.

For performance data collection, a central telemetry system collects performance data from processing blocks such as the illustrated ones and processes them to generate task-specific monitoring data. It is to be noted that the illustrated processing blocks are to perform specific portions of tasks of task graphs created for media workflows, thus the collected performance data are workflow performance data. The processing blocks/sub-blocks typically represent monitored portions of tasks, which are to be performed in a task graph created for a media workflow). For example, in a task graph including a task of video 332 as illustrated in FIG. 3A, the tasks of video 332 to be performed include video decoding performed by a video decoder (not illustrated) to decode a data stream from an existing format and the video encoders 723 to encode the data stream to a required output format, and the video decoders block (not illustrated) and video encoders 723 collect the performance data for respective portions of tasks in the task graph.

FIGS. 8A-B illustrate portions of a graphic user interface (GUI) providing notification for anomaly of a media workflow according to one embodiment of the invention. The GUI may be an interface of an operator's management system, and it summarizes the operational status of a media workflow at different processing blocks.

FIG. 8A illustrates an operational status of a media workflow at a video decoder according to one embodiment of the invention. The status of a video decoder 802 for a media workflow is illustrated in the figure. The video decoder 802 is similar to the decoder 434 of FIG. 4. The media workflow uses H.264 as its codec, the resolution is 1280×720, video scan type is progressive and the expected frame rate is 59.94 fps (frames/second). These items are the characteristics of the media source, and it may be obtained from an orchestrator or a worker without the central telemetry system. The central telemetry system does provide operational status data in the following: The actual frame rate is collected from the decoder is 59.93 frames/second; the bit rate is 17.62 M bits/second; the number of total frames decoded is 4,926,579; the total video lost is 103.102 seconds; and the last video decode time is zero seconds ago (indicating that the video decoder has recently received input data).

It is to be noted that video has been lost at the video decoder 802 for the media workflow at some point in time. The loss of video may be notified through a colored bar at the bottom of the block for the video decoder 802. Depending on the SLA of the media workflow, the severity of the error (video loss) may be major or minor, leading the current health to be visually indicated through marking the colored bar to be red or yellow respectively.

FIG. 8B illustrates an operational status of a media workflow at a video encoder according to one embodiment of the invention. The video encoder 812 is similar to video encoders 437/438 of FIG. 4. The video encoder encodes at 1280×720 at 3.5 M bits/second, which is explicitly listed as the resolution and expected bit rate items. The expected frame rate is 29.97 frames/second, and the codec configuration contain more information than the table can accommodate, and an operator may select "More Info" to get detailed information about the codec configuration. Again, these items are the characteristics of the media workflow, and it may be obtained from an orchestrator or a worker without the central telemetry system. The central telemetry system provides operational status data in the following: the bit rate is 3.41 M bits/second, the frame rate is 29.98 frames/second, and the number of total frames encoded is 2,463,251. Because the video encoder 812 is currently operating properly, the colored bar at the bottom of the block for the video encoder 812 may be green.

FIG. 9 illustrates portions of a graphic user interface (GUI) providing notification for anomalies of a set of media workflows according to one embodiment of the invention. The GUI is in a table format, and it includes columns such as: Workflow identifier (ID) identifying the workflow originating the notification; severity identifying different levels of severity; the components identifying the processing blocks in a media workflow; description describing the details of the notification; and time indicating when the anomaly occurs. Each media workflow is identified as a channel. In one embodiment, the severity possibilities include failure, informational, and warning (not pictured). The failure may be further categorized as major or minor. A failure notification indicates an anomaly that requires immediate operator attention and potentially mitigation via external means. An informational notification indicates that the data deviates from the normal patterns, and may be indicative of potentially severe issues in the future even though it does not currently adversely impact a media workflow's performance. A warning notification indicates an anomaly that should be understood by an operator, and that may indicate increased operational risk in the future; for example, if a backup publisher fails then there has been no immediate impact on end user experience but the system has lost redundancy.

In this example, channel A has a failure, and the failure is at a publisher of a HTTP Dynamic Streaming (HDS) packager. The failure is not able to connect, and the URL indicates the location to which the connection failed. The time of the event is Apr. 8, 2015 at 1:21 PM. Channel B has two information notifications. The first is that the audio decoder lost audio source for 12.979 seconds, ending on Apr. 8, 2015 at 12:46 PM; at the same time, the video decoder also lost video signal slate for 12.094 second. Both events are not considered failures presently, but an operator may review the events and notice that the two event happened at the same time and potentially caused an adverse end user experience, and update the rules in the rule engine to make frequent occurrences of similar events be categorized as failures instead.

Flow Diagram of Anomaly Detection and Mitigation

Figure 10:
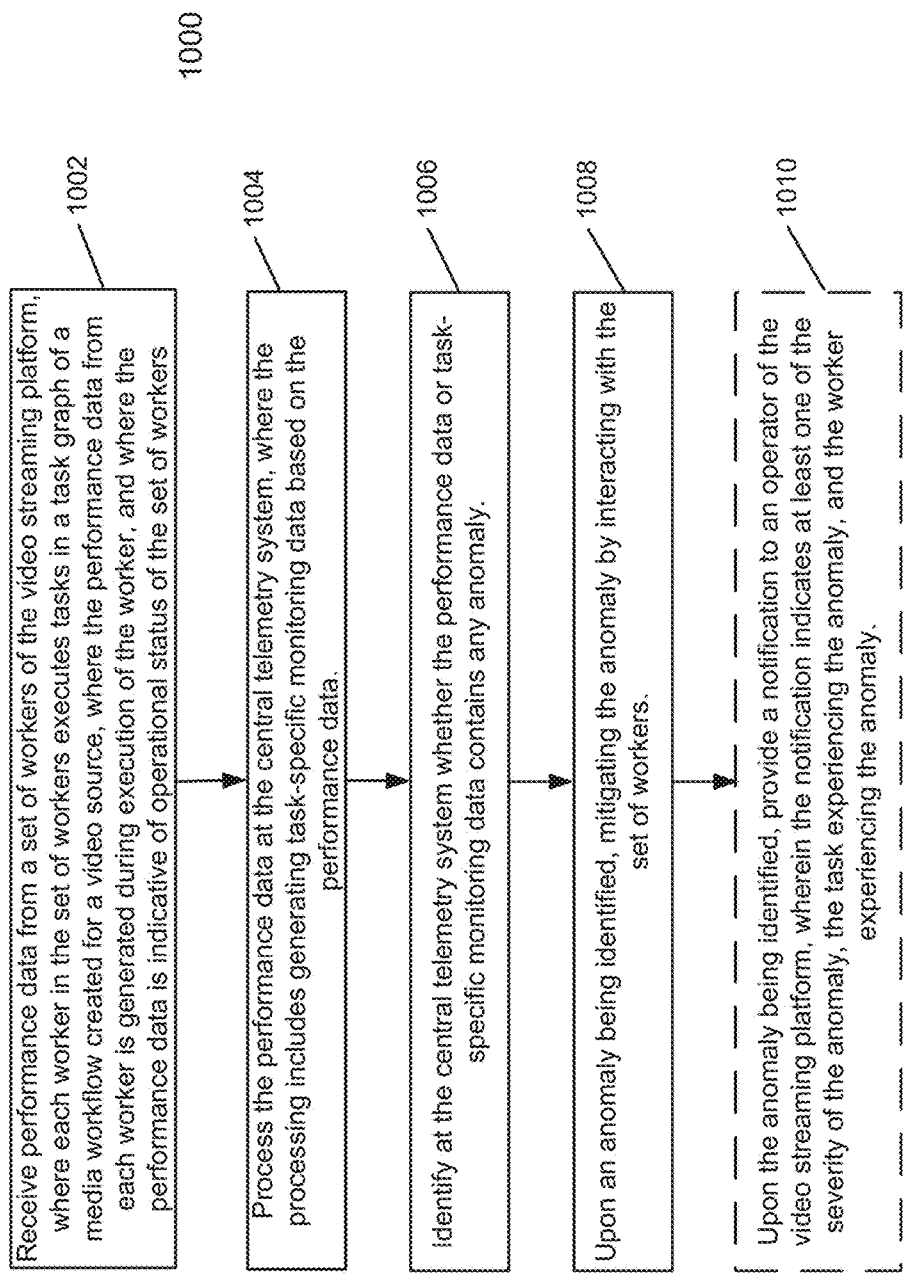
FIG. 10 is a flow diagram illustrating the process of anomaly detection and mitigation according to one embodiment of the invention.

FIG. 10 is a flow diagram illustrating the process of anomaly detection and mitigation according to one embodiment of the invention. Method 1000 may be implemented in a central telemetry system such as CTS 290 as illustrated in FIG. 2.

At reference 1002, performance data from a set of workers a video streaming platform is received at a central telemetry system. Each worker in the set of workers executes tasks in a task graph of a media workflow created for a video source, the performance data from each worker is generated during execution of the worker, and the performance data is indicative of operational status of the set of workers. The operational status of the set of workers includes the operational status of the tasks executed by the set of workers in one embodiment. In one embodiment, the performance data for each worker is derived from execution of the tasks in the task graph, where the task graph is a directed acyclic graph of tasks with each node of the task graph representing a media processing task and each edge of the task graph representing a data flow across two tasks and a corresponding input and output of each task.

At reference 1004, the central telemetry system processes the performance data, where the processing includes generating task-specific monitoring data based on the performance data. The task-specific monitoring data is indicative of the operational status of the tasks. In one embodiment, the generation of the task-specific monitoring data is configured based on characteristics of the media workflow. Thus, for different processing blocks in processing media workflows, different task-specific monitoring data may be generated through different mechanisms. Additionally, the generation of the task-specific monitoring data may include integrating historical performance data with currently collected performance data in one embodiment.

At reference 1006, the central telemetry system identifies whether the performance data or the task-specific monitoring data contains any anomaly. In one embodiment, the identification includes comparing the task-specific monitoring data with stored historical task-specific monitoring data. The anomaly may indicate a failure within a processing block in processing tasks of a task graph created for the specific media workflow. Additionally, the anomaly may include a value of the task-specific monitoring data or the collected performance data crossing a threshold, which is indicative of potential issues that currently do not impact the performance of the set of workers.

At reference 1008, upon an anomaly being identified, the central telemetry system mitigates the anomaly by interacting with the set of workers. In one embodiment, the mitigation includes at least one of restarting a task of the task graph, restarting the media workflow, restarting a worker, each of which is associated with the anomaly. Additionally, the mitigation includes at least one of moving tasks from a worker associated with the anomaly to another worker and preventing all tasks from running on the worker.

Additionally, upon an anomaly being identified, the central telemetry system may provide a notification to an operator of the video streaming platform, where the notification indicates at least one of the severity of the anomaly, the task experiencing the anomaly, and the worker experiencing the anomaly.

Electronic Devices Implementing Embodiments of the Invention

Figure 11:
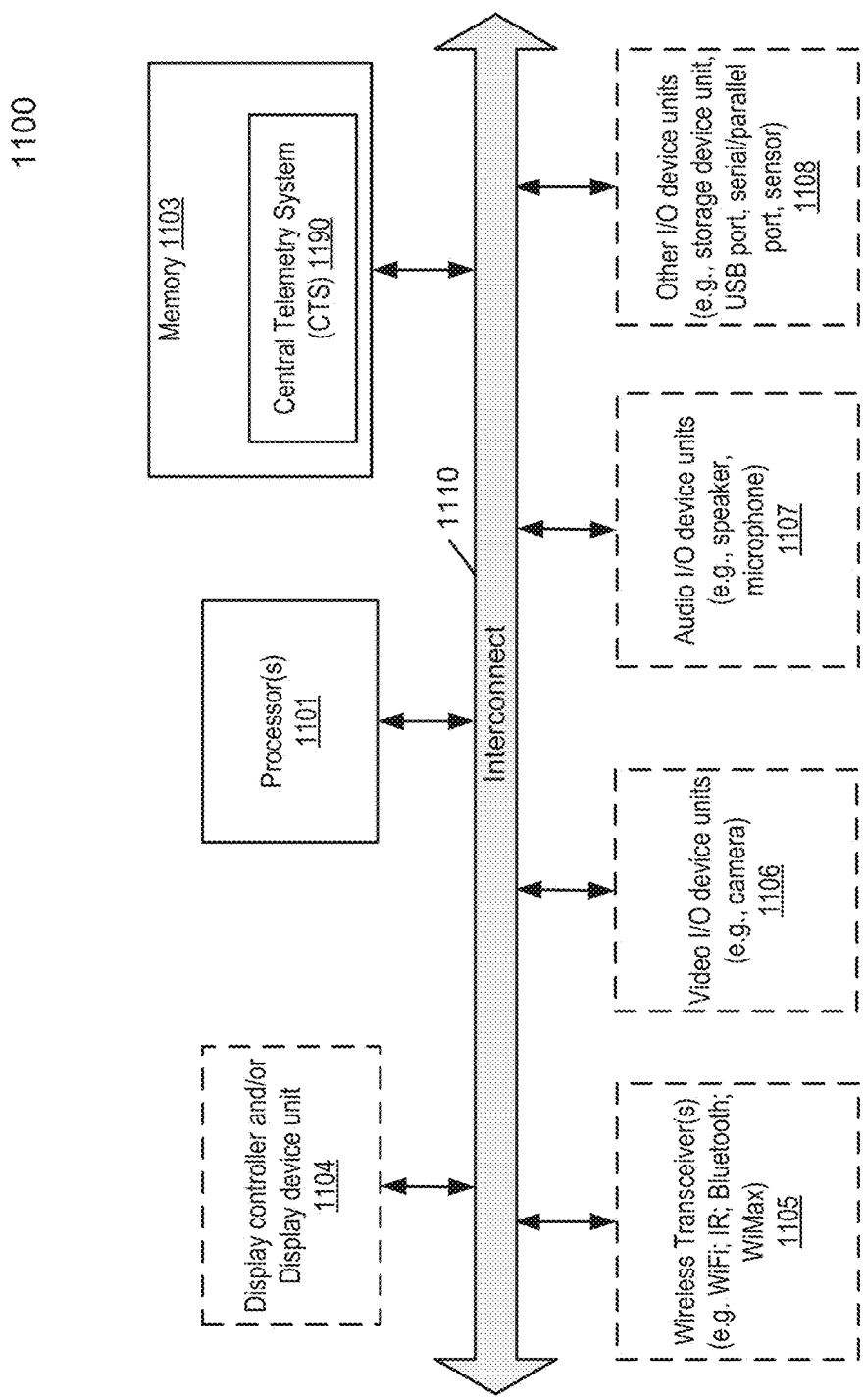
FIG. 11 is a block diagram illustrating an electronic device that may serve as a central telemetry system of a video streaming platform in a cloud computing environment according to one embodiment of the invention.

FIG. 11 is a block diagram illustrating an electronic device that may serve as a central telemetry system of a video streaming platform in a cloud computing environment according to one embodiment of the invention. The electronic device may be a computing device (e.g., a computer server) of a cloud computing environment). The system 1100 may represent the central telemetry system described above performing any of the processes or methods for detecting and mitigating anomaly in a video streaming system described above. The system 1100 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 1100 is intended to show a high level view of many components of the computing system. However, it is to be understood that additional components may be present in certain implementations and furthermore, different arrangement of the components shown may occur in other implementations.

In one embodiment, the system 1100 includes a processor 1101, memory 1103, and optionally device units 1104-1108 that are interconnected via a bus or an interconnect 1110. A processor 1101 may represent a single processor or multiple processors with a single processor core or multiple processor cores included therein. The processor 1101 may represent one or more general-purpose processors such as a microprocessor, a central processing unit (CPU), or processing device. More particularly, the processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 1101 may communicate with the memory 1103, which in an embodiment can be implemented via multiple memory devices to provide for a given amount of system memory. The memory 1103 may include one or more volatile storage (or memory) devices such as random access memory (RAM), dynamic RAM (DRAM), synchronous DRAM (SDRAM), static RAM (SRAM), or other types of storage devices. The memory 1103 may store information including sequences of instructions that are executed by the processor 1101, or any other device units. For example, executable code and/or data of a variety of operating systems, device drivers, firmware (e.g., input output basic system or BIOS), and/or applications can be loaded in the memory 1103 and executed by the processor 1101. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 1103 contains a central telemetry system 1190, which may contain instructions to perform the operations of anomaly detection and mitigation as discussed herein above. The central telemetry system 1190 may contain functional blocks as illustrated in the central telemetry system 490 discussed herein above. The processor 1101 may instantiate the central telemetry system to perform operations to detect and mitigate anomaly as discussed herein above.

The system 1100 may optionally further include input/output (I/O) devices such as the device units 1104-1108, including display control and/or display device unit 1104, wireless transceiver(s) 1105, video I/O device unit(s) 1106, audio I/O device unit(s) 1107, and other I/O device units 1108 as illustrated. The wireless transceiver 1105 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 1100 may also include an ultrasound device unit (not shown) for transmitting a conference session code.

The video I/O device unit 1106 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 1107 may include a speaker and/or a microphone to facilitate voice-enabled functions, such as voice recognition, voice replication, digital recording, and/or telephony functions. Other optional devices 1108 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 1108 may further include certain sensors coupled to the interconnect 1110 via a sensor hub (not shown), while other devices such as a keyboard or thermal sensor may be controlled by an embedded controller (not shown), dependent upon the specific configuration or design of the system 1100.

The system 1100 may be coupled to an orchestrator in an orchestrator as illustrated in FIG. 2. Additionally, the system 1100 may be integrated within a streaming platform coordinator 170, similar to the central telemetry system 190 illustrated in FIG. 1. The system 1100 may perform methods discussed herein above relating to FIGS. 5-6 and/or FIG. 10.

Note that while the system 1100 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagram in FIG. 10 are described with reference to the exemplary embodiment electronic devices of FIG. 11. However, it should be understood that the operations of flow diagrams can be performed by embodiments of the invention other than those discussed with reference to FIG. 10, and the embodiments discussed with reference to FIG. 11 can perform operations different than those discussed with reference to the flow diagrams of FIG. 10.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by an electronic device in a video streaming platform including at least a central telemetry system, the method comprising:
   receiving at the central telemetry system performance data from at least one local telemetry agent of a worker, where the worker is from a set of workers of the video streaming platform, wherein each worker in the set of workers executes tasks in a task graph of a media workflow created for a video source, where each worker in the set of workers is a processing unit in the video streaming platform, wherein the performance data from each worker is generated during execution of the worker, and wherein the performance data is indicative of operational status of the set of workers;
   processing the performance data at the central telemetry system, wherein the processing includes generating task-specific monitoring data based on the performance data;
   identifying at the central telemetry system whether the performance data or the task-specific monitoring data contains an anomaly, where the anomaly includes a failure of a component of the video streaming platform which the media workflow utilizes; and
   upon the anomaly being identified, mitigating the anomaly by interacting with the set of workers by moving tasks from a worker associated with the anomaly to other workers of the streaming platform and preventing all tasks from running on the worker.

2. The method of claim 1, wherein the performance data for each worker is derived from execution of the tasks in the task graph, wherein the task graph is a directed acyclic graph of tasks with each node of the task graph representing a media processing task and each edge of the task graph representing a data flow across two tasks and a corresponding input and output of each task, and wherein the task-specific monitoring data is indicative of operational status of the tasks.

3. The method of claim 1, wherein the at least one local telemetry agent collects performance data for the worker from different processing blocks at different processing stages within the worker.

4. The method of claim 1, wherein generation of the task-specific monitoring data includes integrating historical performance data with the performance data.

5. The method of claim 1, wherein identifying whether the task-specific monitoring data contains the anomaly includes comparing the task-specific monitoring data with stored historical task-specific monitoring data.

6. The method of claim 1, further comprising:
detecting another anomaly where a value of the task-specific monitoring data crosses a threshold, which predicts failure of a component of the video streaming platform that currently does not impact performance of the media workflow.

7. The method of claim 1, wherein mitigating the anomaly further includes at least one of restarting a task of the task graph, restarting the media workflow, restarting a worker, each of which is associated with the anomaly.

8. The method of claim 1, further comprising: upon the anomaly being identified, providing a notification to an operator of the video streaming platform, wherein the notification indicates the severity of the anomaly, the task experiencing the anomaly, and the worker experiencing the anomaly.

9. An electronic device to serve as a central telemetry system in a video streaming platform, the electronic device comprising:
a processor and a non-transitory machine-readable storage medium coupled to the processor, the non-transitory machine-readable storage medium containing operations executable by the processor, wherein the electronic device is operative to: receive at the central telemetry system performance data from at least one local telemetry agent of a worker, where the worker is from a set of workers of the video streaming platform, wherein each worker in the set of workers executes tasks in a task graph of a media workflow created for a video source, where each worker in the set of workers is a processing unit in the video streaming platform, wherein the performance data from each worker is generated during execution of the worker, and wherein the performance data is indicative of operational status of the set of workers; process the performance data at the central telemetry system, wherein the processing includes generating task-specific monitoring data based on the performance data; identify at the central telemetry system whether the performance data or the task-specific monitoring data contains an anomaly, where the anomaly includes a failure of a component of the video streaming platform that the media workflow utilizes; and upon the anomaly being identified, mitigate the anomaly by interacting with the set of workers by moving tasks from a worker associated with the anomaly to other workers of the streaming platform and preventing all tasks from running on the worker.

10. The electronic device of claim 9, wherein the at least one local telemetry agent collects performance data for the worker from different processing blocks at different processing stages within the worker.

11. The electronic device of claim 9, generation of the task-specific monitoring data is to include integrating historical performance data with the performance data.

12. The electronic device of claim 9, wherein the at least one local telemetry agent detects another anomaly that predicts failure of a component of the video streaming platform that currently does not impact performance of the media workflow.

13. The electronic device of claim 9, wherein the mitigation of the anomaly further includes at least one of restarting a task of the task graph, restarting the media workflow, restarting a worker, each of which is associated with the anomaly.

14. The electronic device of claim 9, wherein the electronic device is further operative to: upon the anomaly being identified, provide a notification to an operator of the video streaming platform, wherein the notification indicates the of severity of the anomaly, the task experiencing the anomaly, and the worker experiencing the anomaly.

15. A non-transitory machine-readable storage medium having instructions stored therein, which when executed by a processor, cause the processor to perform operations in an electronic device serving as a central telemetry system in a video streaming platform, the operations comprising:
receiving at the central telemetry system performance data from at least one local telemetry agent of a worker, where the worker is from a set of workers of the video streaming platform, wherein each worker in the set of workers executes tasks in a task graph of a media workflow created for a video source, where each worker in the set of workers is a processing unit in the video streaming platform, wherein the performance data from each worker is generated during execution of the worker, and wherein the performance data is indicative of operational status of the set of workers;
processing the performance data at the central telemetry system, wherein the processing includes generating task-specific monitoring data based on the performance data;
identifying at the central telemetry system whether the performance data or the task-specific monitoring data contains an anomaly, where the anomaly includes a failure of a component of the video streaming platform which the media workflow utilizes; and
upon the anomaly being identified, mitigating the anomaly by interacting with the set of workers by moving tasks from a worker associated with the anomaly to other workers of the streaming platform and preventing all tasks from running on the worker.

16. The non-transitory machine-readable storage medium of claim 15, wherein the at least one local telemetry agent collects performance data for the worker from different processing blocks at different processing stages within the worker.

17. The non-transitory machine-readable storage medium of claim 15, wherein the at least one local telemetry agent detects another anomaly that predicts failure of a component of the video streaming platform that currently does not impact performance of the media workflow.

18. The non-transitory machine-readable storage medium of claim 15, wherein the operations further comprise:
upon the anomaly being identified, providing a notification to an operator of the video streaming platform, wherein the notification indicates the severity of the anomaly, the task experiencing the anomaly, and the worker experiencing the anomaly.

* * * * *